United States Patent
Crevenat et al.

(10) Patent No.: US 7,755,873 B2
(45) Date of Patent: Jul. 13, 2010

(54) DEVICE FOR PROTECTION AGAINST VOLTAGE SURGES WITH PARALLEL SIMULTANEOUSLY TRIGGERED SPARK-GAPS

(75) Inventors: Vincent André Lucien Crevenat, Izeaux (FR); Boris Gautier, Lourdes (FR)

(73) Assignee: ABB France, Rueil-Malmaison Cedex (FR)

( * ) Notice: Subject to any disclaimer, the term of this patent is extended or adjusted under 35 U.S.C. 154(b) by 348 days.

(21) Appl. No.: 10/596,832

(22) PCT Filed: Dec. 22, 2004

(86) PCT No.: PCT/FR2004/003345

§ 371 (c)(1),
(2), (4) Date: Oct. 31, 2008

(87) PCT Pub. No.: WO2005/074083

PCT Pub. Date: Aug. 11, 2005

(65) Prior Publication Data

US 2009/0154044 A1 Jun. 18, 2009

(30) Foreign Application Priority Data

Dec. 30, 2003 (FR) .................................. 03 15551

(51) Int. Cl.
*H02H 3/20* (2006.01)

(52) U.S. Cl. .................... 361/91.1; 361/56; 361/111; 361/117; 361/118; 361/119; 361/126; 361/127; 361/128; 361/129; 361/130

(58) Field of Classification Search .................. 361/56, 361/91.1, 111, 117–119, 126–130
See application file for complete search history.

(56) References Cited

U.S. PATENT DOCUMENTS

| 4,280,098 A | | 7/1981 | Veraldi | |
|---|---|---|---|---|
| 4,625,254 A | * | 11/1986 | Fahlen | ......................... 361/16 |
| 4,683,514 A | * | 7/1987 | Cook | ......................... 361/111 |
| 6,111,740 A | * | 8/2000 | Danowsky et al. | .......... 361/120 |
| 2004/0070913 A1 | | 4/2004 | Macanda | |
| 2005/0063118 A1 | | 3/2005 | Durth et al. | |

FOREIGN PATENT DOCUMENTS

| DE | 10211795 | 7/2003 |
|---|---|---|
| EP | 1102371 | 5/2001 |
| WO | WO03/056670 | 7/2003 |

* cited by examiner

*Primary Examiner*—Jared J Fureman
*Assistant Examiner*—Terrence R Willoughby
(74) *Attorney, Agent, or Firm*—Jason A. Bernstein; Barnes & Thornburg LLP

(57) ABSTRACT

A device for protection against voltage surges, comprising: a first spark gap (E1); a first pre-triggering system (2), electrically connected to the first spark gap (E1), so as to enable its being primed; a control device (4) electrically connected to the first pre-triggering system (2) so as to activate same. The invention is characterized in that it comprises at least a second spark gap (E2) mounted parallel to the first spark gap (E1), and electrically connected to a second pre-triggering system (3), such that the control device simultaneously activates the first and the second pre-triggering systems (2, 3), so as to trigger simultaneously the first and second spark gaps (E1, E2). The invention also concerns devices against voltage surges.

20 Claims, 3 Drawing Sheets

DEVICE FOR PROTECTION AGAINST VOLTAGE SURGES WITH PARALLEL SIMULTANEOUSLY TRIGGERED SPARK-GAPS

PRIORITY CLAIM

This patent application is the U.S. National Phase of International Application No. PCT/FR2004/003345, having an International Filing Date of Dec. 22, 2004, which claims priority to France Patent Application No. 0315551, filed Dec. 30, 2003, the disclosures of which are incorporated herein by reference in their entirety.

FIELD OF THE INVENTION

The present invention relates to the general technical field of devices for protecting electrical installations against voltage surges, in particular transient surges due to lightning.

More particularly, the invention relates to a surge protector device of the spark gap lightning arrestor kind, the device comprising:
 a. a first spark gap;
 b. a first pre-trigger system electrically connected to the first spark gap in such a manner as to enable an arc to be struck therein; and
 c. a control device electrically connected to the first pre-trigger system in such a manner as to activate it.

BACKGROUND OF THE INVENTION

Devices for protecting electrical installations against surges are in widespread use, and are commonly referred to as "lightning arrestors". Their essential purpose is to carry lightning currents to ground, and possibly also to limit the peak additional voltages induced by such currents to a level that can be withstood by the equipment and apparatuses to which they are connected.

It is already known to use a spark gap lightning arrestor to protect an installation against surges. The spark gap is then connected between the phases for protection and ground so that in the event of a surge, the lightning current can be carried to ground.

A spark gap is a well-known device comprising two electrodes placed facing each other and spaced apart in a dielectric medium. One of the electrodes is electrically connected to the phase for protection, while the other electrode is electrically connected to ground. In the event of a surge, as generated by the arrival of lightning current, reaching a so-called "trigger" threshold value, an electric arc is struck between the electrodes of the spark gap, thus creating a short-circuit between the phase and ground. The lightning current then flows from the phase to ground and the electrical installation is preserved.

The electric arc does not extinguish spontaneously and therefore continues to carry a short-circuit current, referred to as the "follow current". This follow current should preferably be interrupted without opening general interrupter devices of the installation, such as circuit breakers, in order to avoid disconnecting the installation.

Spark gap lightning arrestors often have only one spark gap, associated with a pre-trigger system (a trigger electrode), and a control device that is sensitive to voltage and that is electrically connected to the pre-trigger system so as to activate it.

Although such single spark gap devices are advantageous because of their design which is particularly simple, they nevertheless present certain drawbacks, associated in particular with their limited capacity for carrying lightning current and also their limited capacity for breaking follow current.

To mitigate those drawbacks, it is known to connect two or more spark gaps in parallel so as to distribute the lightning current and the follow current better between the parallel-connected spark gaps, thus enabling the overall capacity of the lightning arrestor for carrying lightning current and for breaking follow current to be improved.

Such lightning arrestors with parallel-connected spark gaps generally rely on the following concept.

Two spark gaps are connected in parallel and a respective inductor coil is connected in series with each of them. Thus, when an arc is struck in one of the two spark gaps, the current flowing through the inductor coil connected in series therewith generates a voltage across its own terminals, which voltage is applied across the terminals of the second spark gap, thereby causing it to strike an arc.

Such protector devices, although they provide better protection than devices with a single spark gap, nevertheless suffer from several drawbacks.

Firstly, when the current flowing through the first spark gap is below a predetermined value, the voltage generated across the terminals of the inductor coil is not sufficient to strike an arc in the second spark gap. Under such circumstances, current is not distributed between the two spark gaps, and as a result the capacity of the device for carrying lightning current corresponds substantially to the capacity for carrying lightning current provided by the first spark gap on its own.

Conversely, when the magnitude of the current flowing through the first spark gap is high, the voltage across the terminals of the inductor coil becomes large and is added to the voltage across the terminals of the spark gap, thereby degrading the quality of the peak-limiting performed by the spark gap and thus degrading the level of protection it provides.

It can thus be seen that it would be advantageous to provide a surge protector device which, while being simple and inexpensive in design, nevertheless presents improved capacity for carrying lightning current and for breaking follow current.

SUMMARY OF THE INVENTION

The present invention seeks to remedy the various drawbacks listed above and proposes a novel surge protector device presenting characteristics that are improved from the point of view of its capacity for carrying lightning current and also its capacity for breaking follow current.

Another feature of the invention is to provide a novel surge protector device a very good level of protection.

Another feature of the invention is to provide a novel surge protector device of design that is particularly simple.

Another feature of the invention is to provide a novel surge protector device implementing standard electrical components.

The features given to the invention are achieved with a surge protector device of the spark gap lightning arrestor kind, the device comprising:
 a. a first spark gap;
 b. a first pre-trigger system electrically connected to the first spark gap in such a manner as to enable an arc to be struck therein; and
 c. a control device electrically connected to the first pre-trigger system in such a manner as to activate it;
 the protector device being characterized in that it includes at least one second spark gap connected in parallel with the first spark gap, and electrically connected to a second pre-trigger system connected in parallel with the first pre-trigger system, in such a manner that the control device activates the first and second pre-trigger systems simultaneously so as to trigger the first and second spark gaps simultaneously.

BRIEF DESCRIPTION OF THE DRAWINGS

Other features and advantages of the invention appear and are to be found in greater detail on reading the following description with reference to the accompanying drawings, given purely by way of non-limiting illustration, and in which.

DESCRIPTION OF THE INVENTION

Figure 1:
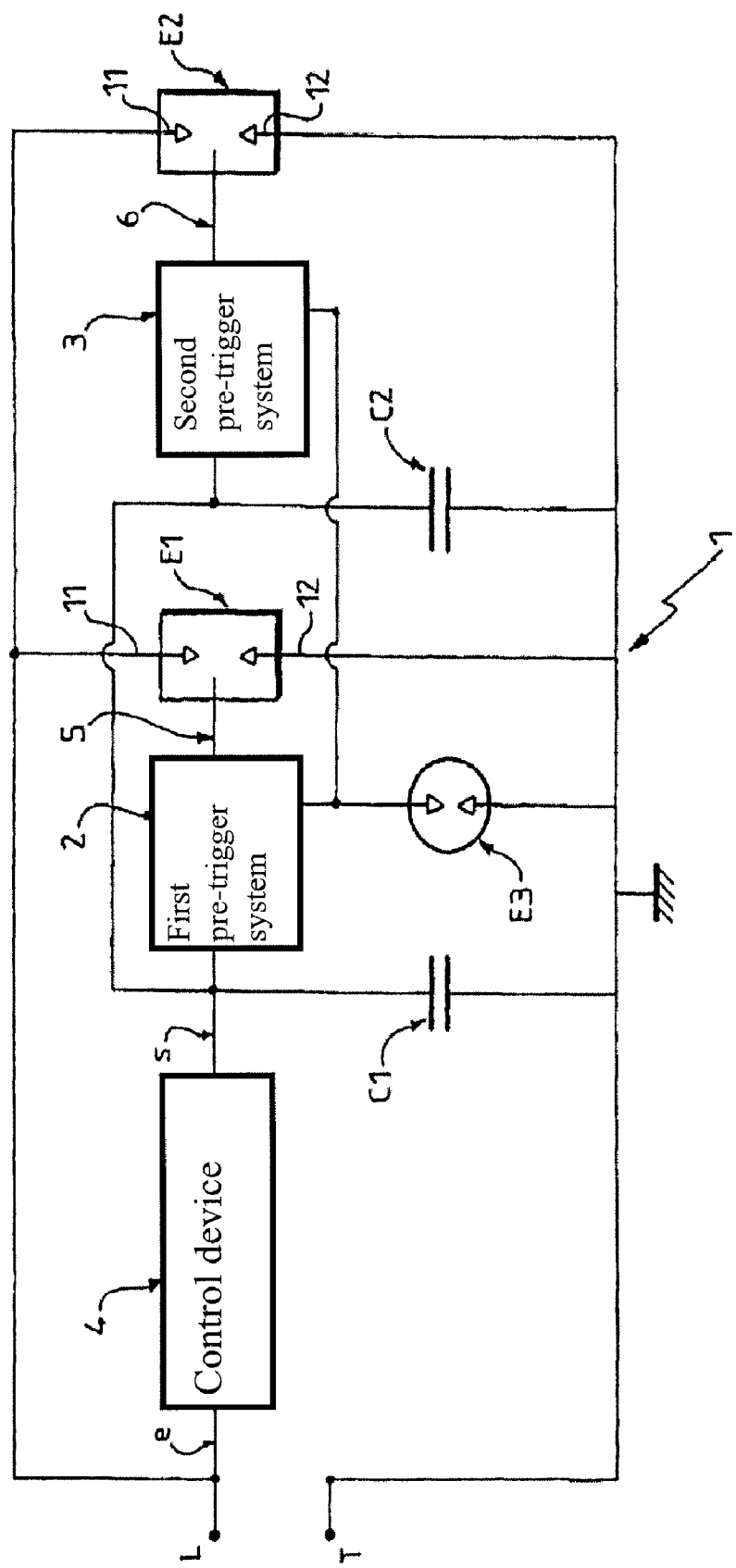
FIG. 1 is an electrical circuit diagram showing the principle of the surge protector device in accordance with the invention, for electrical connection to an electrical installation.

The surge protector device 1 in accordance with the invention is for connection in parallel with the electrical equipment or installation to be protected.

The term "electrical installation" refers to any type of apparatus or network that might be subjected to voltage disturbances, in particular to transient surges due to lightning.

The device is described with reference to FIGS. 1 and 2.

The surge protector device 1 is advantageously for connection between a phase L of the installation to be protected and ground T.

However, without going beyond the ambit of the invention, it is also possible to envisage that instead of being connected in parallel between a phase L and ground T, the device could be connected between neutral and ground, between the phase L and neutral, or indeed between two phases (for differential protection). Under all circumstances, the protector device 1 in accordance with the invention advantageously constitutes a single-pole protector device.

For reasons that are purely illustrative and descriptive, the description below relates to the protector device 1 being connected between the phase L for protection and ground T.

The device, which is a variety of spark gap lightning arrestor, thus comprises according to the invention a first spark gap E1 and a first pre-trigger system 2 electrically connected to the first spark gap E1 in such as a manner as to strike an arc therein.

The protector device 1 of the invention also comprises a control device 4 electrically connected to the first pre-trigger system 2, and preferably disposed upstream therefrom, so as to activate it.

According to the invention, the protector device 1 also includes at least one second spark gap E2 connected in parallel with the first spark gap E1. The second spark gap E2 is electrically connected to a second pre-trigger system 3 connected in parallel with the first pre-trigger system 2, and thus likewise electrically connected to the control device 4 in such a manner as to enable it to be activated simultaneously thereby.

In this way, the control device 4 activates both the first and the second pre-trigger systems 2 and 3 simultaneously so as to trigger the first and second spark gaps E1 and E2 simultaneously.

Thus, by means of the simultaneous triggering of the parallel-connected first and second spark gaps E1 and E2, referred to as "main" spark gaps, the protector device 1 enables lightning currents to be distributed between the two main spark gaps E1 and E2, thus improving the capacity of the device to carry lightning current.

In the meaning of the invention, the term "in parallel" means that the spark gaps E1 and E2 are subjected to the same voltage. Thus, when they become conductive, the spark gaps E1 and E2 both behave like passive two-terminal circuits connected in parallel, with same-sign terminals being subjected to the same potential.

In the same manner, the parallel-connected pre-trigger systems 2 and 3 are subjected to the same voltage when they pass a current.

Such a design also makes it possible to improve the capacity of the protector device 1 to break the follow current, insofar as each of the main spark gaps E1 and E2 "sees" only half of the total magnitude of the follow current, thus making it easier to break said current by the arc-extinguishing means provided in each of the spark gaps E1, E2.

Naturally, in order to further improve the capacity of the protector device 1, it is possible to envisage connecting more than two spark gaps in parallel, e.g., three, four, or even more, without thereby being going beyond the ambit of the invention.

Below the description relates to only two main spark gaps connected in parallel, since the characteristics relating to the two-gap protector device 1 can be transposed in obvious manner to a device having a greater number of spark gaps in parallel.

The spark gaps implemented in the context of the invention may be of any type known to the person skilled in the art, and for example they may be constituted by air-filled or gas-filled spark gaps.

The spark gaps E1 and E2 are preferably gas-filled spark gaps, and more preferably air-filled spark gaps. They present characteristics, and in particular trigger threshold voltages, that are substantially identical, firstly to ensure that they strike simultaneously, and secondly to present equivalent lighting current carrying capacities. Thus, when they become conductive, the spark gaps E1 and E2 carry substantially the same current, corresponding to substantially half the total current being carried by the protector device 1.

In conventional manner, each spark gap E1, E2 comprises a first main electrode 11, electrically connected to the phase L for protection, and a second main electrode 12, electrically connected to ground T (FIG. 1).

In the meaning of the invention, the term "in parallel" thus refers to the fact that substantially the same voltage is applied between the main electrodes 11 and 12 of the parallel-connected spark gaps.

The exemplary embodiments of the invention are described below with reference to FIGS. 2 and 3.

Figure 2:
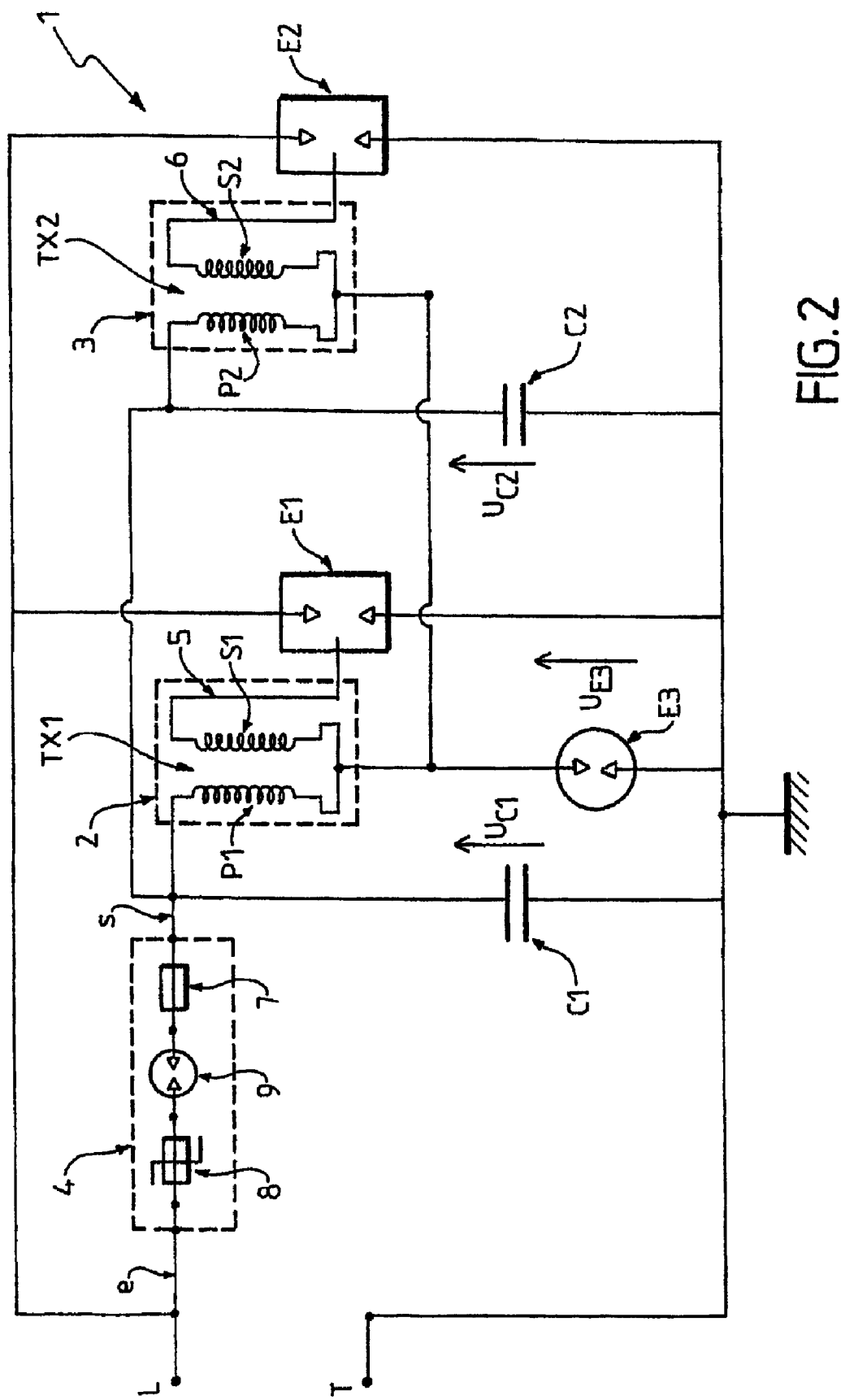
FIG. 2 is a detailed electrical circuit diagram of an exemplary embodiment of the surge protector device in accordance with the invention, for connection to an electrical installation.

In a first exemplary embodiment of the invention, shown in FIG. 2, each pre-trigger system 2, 3 is advantageously formed by an electronic system having a trigger electrode 5, 6 and a transformer TX1, TX2.

The trigger electrodes 5, 6 are of conventional type, and serve in particular to ionize the gas or the air contained in the chamber of the spark gap, thereby leading to an electric arc being formed between the main electrodes 11, 12 of the spark gap, which then becomes conductive.

In particularly advantageous manner, each trigger electrode 5, 6 is electrically connected to the secondary circuit S1, S2 of the associated transformer TX1, TX2.

In a variant of the invention, not shown in the figures, the secondary circuit S1, S2 of the transformer TX1, TX2 is connected directly to the main electrode 11 of the spark gap E1, E2 so as to trigger it. In this variant, the pre-trigger system 2, 3 is then not provided with an additional trigger electrode 5, 6, and is formed by an electronic system comprising a transformer TX1, TX2 and a main electrode 11 of the spark gap E1, E2, said main electrode 11 then forming the trigger electrode.

As shown in FIG. 2, the primary circuits P1, P2 of the transformers TX1, TX2 corresponding respectively to the first and second pre-trigger system 2, 3 are advantageously connected in parallel.

In addition, the primary circuits P1, P2 of the transformers TX1, TX2 are each electrically connected to the output s of the control device 4.

By means of this particular configuration, the control device 4 can activate both trigger electrodes 5, 6 simultaneously, which will in turn cause the main spark gaps E1 and E2 to strike at the same time.

The control device 4 is advantageously sensitive to voltage, and may be constituted, for example, by fuses 7, varistors 8, and spark gaps 9.

Such a voltage-sensitive device is well known to the person skilled in the art and can also be made using other non-linear components, e.g., peak-clipping diodes.

In preferred manner, a plurality of components are connected together in series, e.g., a spark gap 9 and a varistor 8, in order to benefit from the advantages of the two technologies.

The input e of the control device 4 is advantageously electrically connected to the phase L for protection.

In normal operation, the impedance of the control device 4 is such that it prevents current from passing from the phase L to the protector device 1, thereby isolating the protector device.

In contrast, when a surge occurs, the control device 4 is suitable for passing from a very high impedance state to an almost short-circuit state, thus allowing current to flow into the protection device 1.

Advantageously, the primary circuit P1, P2 of each transformer TX1, TX2 is electrically connected to a capacitor C1, C2 which is charged under the control of the control device 4.

In particularly advantageous manner, the protector device 1 includes a third spark gap E3 connected in parallel with the capacitors C1, C2.

In this way, when the voltage across the terminals of the capacitors C1 and C2 reaches the trigger threshold of the third spark gap E3, it short-circuits the capacitors C1, C2 which then discharge into the primary circuits P1, P2 of the transformers TX1, TX2.

In a first variant exemplary embodiment, the protector device 1 may have a single capacitor C1 advantageously connected between the output s of the control device 4 and ground T. The third spark gap E3 is then connected in parallel with the capacitor C1 and electrically connected to the primary circuit P1, P2 of each of the parallel-connected transformers TX1, TX2.

In a preferred variant of the invention, the protector device 1 has a first capacitor C1 and a second capacitor C2, the second capacitor C2 being connected in parallel with the first capacitor C1, and both capacitors C1, C2 being likewise connected in parallel with the third spark gap E3.

In this variant, each of the first and second capacitors C1, C2 is electrically connected to the primary circuit P1, P2 of an associated transformer TX1, TX2. Thus, the first capacitor C1 may be connected to the primary circuit P1 of the transformer TX1, and the second capacitor C2 is then connected to the primary circuit P2 of the transformer TX2 (FIG. 2).

Figure 3:
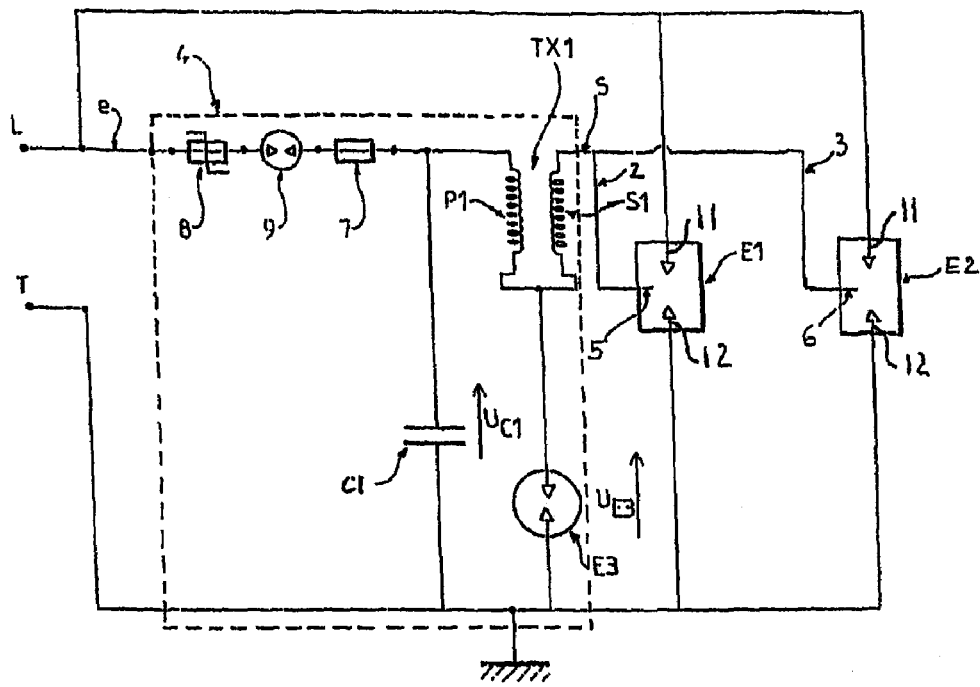
FIG. 3 is a detailed electrical circuit diagram of another exemplary embodiment of the surge protector device in accordance with the invention.

In a second exemplary embodiment of the invention, as shown in FIG. 3, each pre-trigger system 2, 3 is formed by a respective trigger electrode 5, 6 of the spark gaps E1, E2. In this case, the control device 4 advantageously includes a transformer TX1 whose secondary circuit S1 is connected to each of the pre-trigger systems 2, 3, i.e., to each of the trigger electrodes 5, 6. Naturally, without going beyond the ambit of the invention, it is possible to envisage the secondary circuit S1 of the transformer TX1 being connected directly to one of the main electrodes 11 of the parallel-connected spark gaps E1, E2. In this variant, which is not shown in the figures, the main electrode 11 then forms the pre-trigger system of the associated spark gap E1, E2.

By means of this particular configuration, the control device 4 can activate the two trigger electrodes 5, 6 simultaneously which in turn strike arcs at the same time in the main spark gaps E1, E2.

In this exemplary embodiment, the output s of the control device 4 advantageously corresponds to the output of the secondary circuit S1 of the transformer TX1. The protector device 1, and more particularly the control device 4, advantageously includes a capacitor C1 electrically connected to the primary P1 of the transformer TX1. The protector device 1, and in particular the control device 4, preferably further includes a third spark gap E3 connected in parallel with the capacitor C1.

In the same manner as in the first-described exemplary embodiment, when the voltage across the terminals of the capacitor C1 reaches the trigger threshold value for the third spark gap E3, it short-circuits the capacitor C1 which then discharges into the primary circuit P1 of the transformer TX1.

Each of the trigger electrodes 2, 3 connected to the output s of the control device 4, and more precisely to the output of the secondary circuit S1 and thus subjected simultaneously to the same potential, thus serves to strike an arc at the same time in both of the main spark gaps E1, E2.

Figure 4:
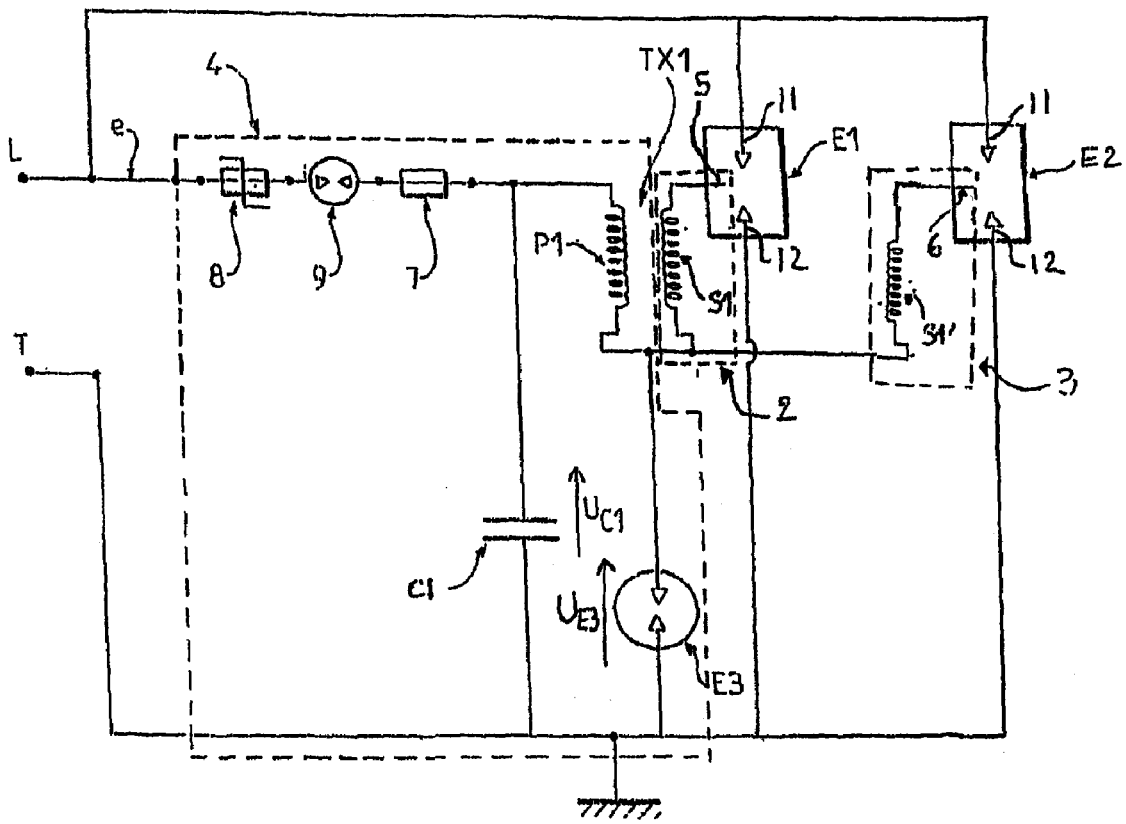
FIG. 4 is a detailed electrical circuit diagram of yet another exemplary embodiment of the surge protector device in accordance with the invention.

In a third exemplary embodiment of the invention shown in FIG. 4, each pre-trigger system 2, 3 is formed by a system comprising a trigger electrode 5, 6 for each of the spark gaps E1, E2 and a respective secondary circuit S1, S1' of a transformer TX1.

In this variant, the transformer TX1 has one primary circuit P1 and two secondary circuits S1, S1' respectively connected to the trigger electrodes 5, 6.

The primary circuit P1 of the transformer TX1 advantageously forms part of the control device 4 which further includes the capacitor C1 and the third spark gap E3. In this way, when the voltage across the terminals of the capacitor C1 reaches the trigger threshold value of the third spark gap E3, it short-circuits the capacitor C1 which then discharges through the primary circuit P1 of the transformer TX1.

The secondary circuits S1, S1' of the transformer TX1 are advantageously connected in parallel and preferably formed by identical windings, so the voltages generated across their terminals are identical and have the effect of activating the trigger electrodes 5 and 6 simultaneously, thereby striking arcs at the same time in the main spark gaps E1, E2.

In a variant exemplary embodiment, not shown in the figures, the outputs from the secondary circuits S1, S1' of the transformer TX1 are connected directly to respective main electrodes 11 of the spark gaps E1 and E2 so as to ensure that arcs are struck simultaneously therein. In this variant, the spark gaps E1, E2 do not have trigger electrodes 5, 6, and each of the pre-trigger systems 2, 3 is formed by a system comprising one of the secondary circuits S1, S1' of the transformer TX1 together with the corresponding main electrode 11 of one of the spark gaps E1, E2.

By triggering two parallel-connected main spark gaps E1 and E2 simultaneously, the protector device 1 of the invention thus considerably improves the capacity of the lightning arrestor for carrying lightning current and for breaking follow current.

The protector device 1 in accordance with the invention operates in the manner described below with reference to FIGS. 1, 2, 3, and 4.

The single-pole protector device 1 of the invention is connected in parallel between the phase L of an electrical installation for protection and ground, so as to enable it to carry lightning current, if any, to ground.

In normal operation, i.e., when no surge is present on the phase line L, the protection device 1 is isolated from the electrical installation by the control device 4 which then presents very high impedance.

In contrast, in the event of a surge occurring on the phase L, in particular a surge of transient origin, and assuming that the amplitude of the surge is sufficient to trigger the voltage-sensitive control device 4, in particular a spark gap 9 located within said device, then the control device 4 becomes conducive and allows current to flow from the phase L to the protector device 1, thus charging the capacitor C1 or substantially simultaneously charging the parallel-connected capacitors C1 and C2.

Since the third spark gap E3 is connected in parallel with the first capacitor C1, the voltage across the terminals of said third spark gap E3, written $U_{E3}$, is substantially equal to the voltage $U_{C1}$ across the terminals of the capacitor C1. Similarly, in the first exemplary embodiment as shown in FIG. 1, the voltage across the terminals of the second capacitor C2, written $U_{C2}$, is substantially equal to the voltage $U_{E3}$ across the terminals of the third spark gap E3. Thus, when the voltage $U_{C1}$, and $U_{C2}$ as the case may be, reaches the trigger threshold value of the third spark gap E3, an avalanche phenomenon occurs therein and it becomes conductive.

The first and/or second capacitor(s) C1, C2 can then discharge through the primary circuits P1, P2 of the corresponding transformer TX1, TX2. The transformer TX1, TX2 then performs its conventional function of amplifying voltage, thus enabling a voltage to be obtained across the terminals of the secondary circuit S1, S1', S2 that is of amplitude that is greater in absolute value than the voltage across the terminals of the primary circuit P1, P2.

The secondary circuit S1, S1', S2 of the transformer TX1, TX2 then generates a voltage pulse and the trigger electrodes 5, 6 are subjected simultaneously to the same potential causing a spark to be struck between the main electrodes 11 and 12, thereby ensuring that the main spark gaps E1 and E2 strike simultaneously.

In this way, the lightning current can be shared between the two main spark gaps E1, E2 which, being associated in this way, thus present characteristics that are superior to a single spark gap. Likewise, since the follow current is distributed between the two main spark gaps E1, E2, it is easier to extinguish.

The industrial application of the invention lies in manufacturing devices for providing protection against transient surges.

All patents, applications and publications referred to herein are incorporated by reference in their entirety.

The invention claimed is:

1. A surge protector device of the spark gap lightning arrestor kind, the device comprising:
a) a first spark gap;
b) a first pre-trigger system electrically connected to the first spark gap in such a manner as to enable an arc to be struck therein;
c) a control device electrically connected to the first pre-trigger system in such a manner as to activate it;
d) at least one second spark gap connected in parallel with the first spark gap; and,
e) a second pre-trigger system electrically connected to the second spark gap and connected in parallel with the first pre-trigger system, in such a manner that the control device activates the first and second pre-trigger systems simultaneously so as to trigger the first and second spark gaps simultaneously,
wherein each pre-trigger system is an electronic system comprising a trigger electrode and a transformer having a primary winding, and
wherein the primary windings of the transformers corresponding respectively to the first and second pre-trigger systems are connected in parallel.

2. The device of claim 1, wherein the control device has at least one output, the primary windings of the transformers being electrically connected to the at least one output of the control device.

3. The device of claim 1, wherein the control device is sensitive to voltage.

4. The device of claim 3, wherein the control device comprises at least one component selected from the group consisting of a fuse, a varistor, and a spark gap.

5. The device of claim 1, wherein the transformer corresponding to each pre-trigger system has a secondary winding, each trigger electrode being electrically connected to the secondary winding of the transformer of the corresponding pre-trigger system.

6. A surge protector device of the spark gap lightning arrestor kind, the device comprising:
a) a first spark gap;
b) a first pre-trigger system electrically connected to the first spark gap in such a manner as to enable an arc to be struck therein;
c) a control device electrically connected to the first pre-trigger system in such a manner as to activate it;
d) at least one second spark gap connected in parallel with the first spark gap; and
e) a second pre-trigger system electrically connected to the second spark gap and connected in parallel with the first pre-trigger system, in such a manner that the control device activates the first and second pre-trigger systems simultaneously so as to trigger the first and second spark gaps simultaneously,
wherein each pre-trigger system is an electronic system comprising a trigger electrode together with a transformer having a primary winding, the primary windings of the transformers being electrically connected to at least one output of the control device.

7. The device of claim 6, wherein the primary winding of each transformer is electrically connected to a capacitor that is charged under the control of the control device.

8. The device of claim 6, wherein the control device is sensitive to voltage.

9. The device of claim 8, wherein the control device comprises fuses, varistors, and spark gaps.

10. The device of claim 6, wherein the transformer corresponding to each pre-trigger system has a secondary winding, each trigger electrode being electrically connected to the secondary winding of the transformer of the corresponding pre-trigger system.

11. A surge protector device of the spark gap lightning arrestor kind, the device comprising:
    a) a first spark gap;
    b) a first pre-trigger system electrically connected to the first spark gap in such a manner as to enable an arc to be struck therein;
    c) a control device electrically connected to the first pre-trigger system in such a manner as to activate it;
    d) at least one second spark gap connected in parallel with the first spark gap; and,
    e) a second pre-trigger system electrically connected to the second spark gap and connected in parallel with the first pre-trigger system, in such a manner that the control device activates the first and second pre-trigger systems simultaneously so as to trigger the first and second spark gaps simultaneously,
    wherein each pre-trigger system is formed by a system comprising a trigger electrode together with a secondary winding of a transformer, and
    wherein each transformer has a primary winding which is electrically connected to a capacitor that is charged under the control of the control device.

12. The device of claim 11, further comprising a third spark gap connected in parallel with the capacitor such that when the voltage across the terminals of the capacitor reaches the trigger threshold value for said third spark gap, the capacitor is short-circuited, which then discharges through the primary winding of the transformer.

13. The device of claim 12, comprising first and second capacitors connected in parallel with the third spark gap, and each of the first and second capacitors being electrically connected to the primary winding of a respective one of the transformers.

14. The device of claim 11, wherein the control device is sensitive to voltage and comprises fuses, varistors and spark gaps.

15. The device of claim 11 wherein each trigger electrode is electrically connected to the secondary winding of a respective one of the transformers.

16. A surge protector device of the spark gap lightning arrestor kind, the device comprising:
    a) a first spark gap;
    b) a first pre-trigger system electrically connected to the first spark gap in such a manner as to enable an arc to be struck therein;
    c) a control device electrically connected to the first pre-trigger system in such a manner as to activate it, the control device being sensitive to voltage;
    d) at least one second spark gap connected in parallel with the first spark gap; and,
    e) a second pre-trigger system electrically connected to the second spark gap and connected in parallel with the first pre-trigger system, in such a manner that the control device activates the first and second pre-trigger systems simultaneously so as to trigger the first and second spark gaps simultaneously.

17. The device of claim 16, comprising fuses, varistors, and spark gaps.

18. A surge protector device of the spark gap lightning arrestor kind, the device comprising:
    a) a first spark gap;
    b) a first pre-trigger system electrically connected to the first spark gap in such a manner as to enable an arc to be struck therein;
    c) a control device electrically connected to the first pre-trigger system in such a manner as to activate it;
    d) at least one second spark gap connected in parallel with the first spark gap; and,
    e) a second pre-trigger system electrically connected to the second spark gap and connected in parallel with the first pre-trigger system, in such a manner that the control device activates the first and second pre-trigger systems simultaneously so as to trigger the first and second spark gaps simultaneously,
    wherein each pre-trigger system is formed by a trigger electrode, the trigger electrode being electrically connected to a secondary winding of an associated transformer which associated transformer has a primary winding, the primary windings of the transformers being connected in parallel.

19. The device of claim 18, wherein the control device is sensitive to voltage.

20. The device of claim 19, wherein the control device comprises fuses, varistors, and spark gaps.

* * * * *